United States Patent Office 2,968,597
Patented Jan. 17, 1961

2,968,597
METHOD AND COMPOSITION FOR DETECTING CANDIDA ALBICANS

Joseph F. Pagano, Bound Brook, and Joseph D. Levin, Highland Park, N.J., assignors to Olin Mathieson Chemical Corporation, New York, N.Y., a corporation of Virginia No Drawing. Filed Oct. 1, 1957, Ser. No. 687,362

9 Claims. (Cl. 195—103.5)

This invention relates to a diagnostic culture medium utilizable for the detection of the pathogenic yeast *Candida albicans*.

Prior to this invention, various media containing biological indicator systems have been used in an attempt to ascertain the presence of pathogenic species of the genus Candida. These compositions, however, have not been widely used inasmuch as, at best, they enabled only the identification of the genus, it being desirable to distinguish between the presence of the pathogenic *C. albicans* and the other species of the genus. Other available compositions have made use of antibiotics which inhibit bacterial flora and selectively inhibit non-pathogenic yeasts; but, in these compositions also, it has been difficult to distinguish pathogenic species from other species of the same genus.

By the practice of this invention, however, this inability to distinguish between the pathogen *C. albicans* and the other species of the genus is obviated, and there is provided a simple efficient means of specifically determining the presence of this pathogenic species of the yeast Candida.

It, therefore, is an object of this invention to provide a diagnostic culture medium on which *Candida albicans* will grow with such distinctive characteristics that it can be easily distinguished from the other species of the same genus and from other yeasts. A further object of this invention is the provision of a method for the detection of *Candida albicans*, involving use of such culture medium.

These objects have been achieved by the use of the compositions of this invention, which essentially comprise a source of carbon and energy, a source of nitrogen, a broad spectrum antibacterial antibiotic (including salt forms thereof) and a tetrazolium indicator in a concentration of not more than about 0.2 mg./ml. of medium.

Preferably, the compositions of this invention essentially comprise a nutrient medium of soluble carbohydrate (e.g. dextrose, fructose), a source of vitamins and minerals (e.g. yeast extract), a source of nitrogen (e.g. peptone, glycine), a solidifying agent (e.g. agar), a broad spectrum antibacterial antibiotic (e.g. neomycin, tetracycline, penicillin, streptomycin chloramphenicol), in concentrations sufficient to inhibit bacterial growth and, a mono-tetrazolium salt in a concentration of the order of 0.1 mg./ml. of medium.

The compositions of this invention are prepared by mixing a sterile solution containing the soluble carbohydrate, the source of vitamins and minerals, the source of nitrogen, and the solidifying agent with a sterile solution containing the tetrazolium indicator and the antibiotic, and allowing said mixture to solidify.

The method of detecting the presence of the pathogenic species of yeast essentially comprises inoculating the surface of the compositions of this invention with samples of the organisms in question and observing the color change to determine the presence of the pathogenic *C. albicans*. The presence of the pathogen is indicated by a growth that varies in color from that of the other species of this genus and other genera of yeast. For example, the pathogen appears as a white or cream colored growth, or possesses a slight tinge of pink at the heavy portion of growth; whereas the presence of the other species is indicated by a colored growth ranging in shades from pink to rose, when 2,3,5-triphenyltetrazolium chloride is used as the indicator. When 2,5-diphenyl-3-α-naphthyltetrazolium chloride is used, the growth of the pathogenic *C. albicans* is characterized by a white or faint violet coloration, whereas the presence of the other species of the genus Candida and of other yeast genera is indicated by a colored growth ranging in shades from violet to very dark violet. The presence of the pathogen *C. albicans*, when 2,5-diphenyl-3-orthotolyl-tetrazolium chloride is used, is indicated by a growth that is white, cream colored or possessing a slight tinge of pink at the heavy portion of growth, while the presence of the other species, and of other genera of yeast, is indicated by a colored growth of varying shades of cherry red.

The following illustrates the method of preparing the diagnostic culture medium of this invention:

EXAMPLE I

Prepare this medium by first making the following two solutions:

Solution 1

| | Gm. |
|---|---|
| Dextrose | 40 |
| Peptone | 10 |
| Yeast extract | 1 |
| Agar | 15 |

Distilled water to 1 liter.

Stir all the above ingredients for at least 5 minutes. Dissolve with the aid of heat, stirring all the time to avoid charring or searing. The solution should be clear; if not filter. It is not necessary to adjust the pH but it should fall between 5.9 and 6.4. Autoclave for 20 minutes at 15 lbs. pressure.

Solution 2

| | |
|---|---|
| 2,3,5-triphenyltetrazolium chloride | 100 mg. |
| Neomycin sulfate | Adjust weight to 500 mg. of neomycin base, depending on potency of the sulfate. |
| Distilled water | 10 ml. |

Dissolve by shaking; heat gently (not over 55° C. for 1–2 minutes); sterile filter.

Cool Solution 1 to 50–55° C., and aseptically add to it Solution 2. Mix thoroughly.

Maintain the above temperature of this completed medium by keeping the vessel in a properly regulated heating mantle or water bath. With a sterile filling device dispense 2.5 ml. to each vial. Cap the vials loosely, slant the vials until solidified and then cap the vials tightly.

The following is illustrative, but not limitative of the compositions of this invention:

One liter of the completed medium will then contain:

| | Gm. |
|---|---|
| Dextrose | 40 |
| Peptone | 10 |
| Yeast extract | 1 |
| Neomycin, base equivalent | 0.5 |
| 2,3,5-triphenyltetrazolium chloride | 0.1 |
| Agar, granulated | 15 |

Distilled water to 1 liter.
pH, 5.8 to 6.2.

Other antibiotics capable of imparting antibacterial properties to the medium which may be used in lieu of the neomycin include, inter alia, tetracycline, penicillin, streptomycin, chloramphenicol (or salts thereof).

The diagnostic medium is then inoculated and the organism cultured in a manner known to those familiar with the art. In general, the species of Candida other than *C. albicans* form colonies which are pink to rose, becoming darker with extended incubation, whereas the pathogenic *Candida albicans* tend to remain cream colored or faintly pink.

Table I hereinafter indicates the results obtained when the diagnostic medium was inoculated with the representative pathogen *C. albicans*, other species of Candida and other yeasts and incubated for three days.

EXAMPLE II

By replacing the 2,3,5-triphenyltetrazolium chloride of Example I with 30 mg. of 2,5-diphenyl-3-α-naphthyltetrazolium chloride, a medium may be prepared which distinguishes the growth of the pathogenic *Candida albicans* from that of other species of Candida and other yeasts as indicated in Table I.

EXAMPLE III

By replacing the 2,3,5-triphenyltetrazolium chloride of Example I with a like amount of 2,5-diphenyl-3-orthotolyltetrazolium chloride, the growth of the pathogenic *C. albicans* can be distinguished from that of other species of Candida and other yeasts as indicated in Table I.

It should be noted that longer periods of incubation and/or the inclusion of larger quantities of the tetrazolium indicator will cause a more intense coloration in the growth of the pathogenic *Candida albicans* as well as in that of the other species of Candida and the other yeast thereby making differentiation of the pathogen *C. albicans* from the other organisms more difficult.

The invention may be variously otherwise embodied within the scope of the appended claims.

TABLE I

Color reaction obtained after incubating various yeasts on nutrient media containing 0.5 mg./ml. neomycin and using the following mono-tetrazolium salts at the indicated levels:
A=2,3,5-triphenyltetrazolium Cl 0.1 mg./ml.
B=2,5-diphenyl-3-α-naphthyltetrazolium Cl 0.03 mg./ml.
C=2,5-diphenyl-3-orthotolyltetrazolium Cl 0.1 mg./ml.

[Incubation: Three days at room temperature]

| Organism | A | B | C |
|---|---|---|---|
| *Candida albicans* (1)[1] | faint pink | faint violet | faint pink. |
| *C. albicans* (2)[1] | do | do | Do. |
| *C. albicans* (3)[1] | do | do | Do. |
| *C. albicans* (4)[1] | do | do | Do. |
| *C. guilliermondi* | dark rose | violet | light cherry red. |
| *C. pseudotropicalis* | rose | do | Do. |
| *C. stellatoidea* | dark rose | do | Do. |
| *C. tropicalis* | do | do | cherry red. |
| *Saccharomyces cerevisiae* | do | do | light cherry red. |
| *Hansenula saturnus* | dark pink | do | cherry red. |
| *Zygosaccharomyces priorianus* | dark rose | do | Do. |

[1] Indicates different sources of the organism.

What is claimed is:

1. A diagnostic culture medium for the detection of *Candida albicans* essentially comprising a source of carbon and energy, a source of nitrogen, a broad spectrum antibacterial antibiotic and a monotetrazolium indicator in a concentration of not more than about 0.2 mg./ml. of medium.

2. A diagnostic culture medium for the detection of *Candida albicans* essentially comprising a source of carbon and energy, a source of nitrogen, a broad spectrum antibacterial antibiotic and a monotetrazolium salt in a concentration of the order of 0.1 mg./ml. of medium.

3. The composition of claim 2 wherein the broad spectrum antibacterial antibiotic is neomycin.

4. The composition of claim 2 wherein the monotetrazolium salt is 2,3,5-triphenyltetrazolium chloride.

5. The composition of claim 2 wherein the monotetrazolium salt is 2,5-diphenyl-3-orthotolyltetrazolium chloride.

6. A diagnostic culture medium for the detection of *Candida albicans* essentially comprising a source of carbon and energy, a source of nitrogen, a broad spectrum antibacterial antibiotic and 2,5-diphenyl-3-α-naphthyltetrazolium chloride in a concentration of the order of 0.03 mg./ml. of medium.

7. The composition of claim 6 wherein the broad spectrum antibacterial antibiotic is neomycin.

8. A method for the detection of *Candida albicans* which essentially comprises inoculating the surface of a culture medium with a sample of the organism in question, the culture medium essentially comprising a source of carbon and energy, a source of nitrogen, a broad spectrum antibacterial antibiotic and a monotetrazolium indicator in a concentration of not more than about 0.2 mg./ml. of medium.

9. A diagnostic culture medium for the detection of *Candida albicans* essentially comprising a source of carbon and energy, a source of nitrogen, neomycin and 2,3,5-diphenyltetrazolium chloride in a concentration of an order of 0.03 mg./ml. of medium.

References Cited in the file of this patent

UNITED STATES PATENTS

| 2,713,581 | Pannone | July 19, 1955 |
| 2,761,813 | Goetz | Sept. 4, 1956 |
| 2,799,620 | Waksman et al. | July 16, 1957 |

FOREIGN PATENTS

| 757,246 | Great Britain | Sept. 19, 1956 |
| 905,075 | France | Nov. 3, 1945 |

OTHER REFERENCES

Porter et al.: Bacterial Chemistry and Physiology, 1946, Wiley, pages 53–57.

Lodder et al.: The Yeasts: A Taxonomic Study, Interscience Pub. Co., Inc., N.Y., 1952, pages 471–477.

Difco Manual, 9th ed., 1953, Divco Labs., Detroit 1, Michigan, pages 250–254, 293.

Hesseltine: Abstracts of S.N. 229,296, pub. Sept. 29, 1953, 1 page.

Journal of the Am. Water Works Assn.: Vol. 45, No. 11, November 1953, pages 1196 to 1210.